(12) United States Patent
Laplace

(10) Patent No.: US 10,793,352 B2
(45) Date of Patent: Oct. 6, 2020

(54) LOCKING DEVICE AND METHOD FOR LOCKING A WHEEL TRACK TO AN END BEAM, CARTON FLOW BED RACK AND USE

(71) Applicant: Interroll Holding AG, Sant' Antonino (CH)

(72) Inventor: Jean Michel Laplace, La Roche sur Yon (FR)

(73) Assignee: INTERROLL HOLDING AG (CH)

( * ) Notice: Subject to any disclaimer, the term of this patent is extended or adjusted under 35 U.S.C. 154(b) by 0 days.

(21) Appl. No.: 16/364,655

(22) Filed: Mar. 26, 2019

(65) Prior Publication Data

US 2019/0300282 A1 Oct. 3, 2019

(30) Foreign Application Priority Data

Mar. 28, 2018 (EP) .................................... 18290024

(51) Int. Cl.
*B65G 1/02* (2006.01)
*B65G 13/11* (2006.01)

(52) U.S. Cl.
CPC .............. *B65G 1/023* (2013.01); *B65G 13/11* (2013.01)

(58) Field of Classification Search
CPC ........ B65G 1/023; B65G 13/11; B65G 39/12; A47F 1/12; A47F 5/0043; A47B 96/06
USPC .......................................................... 193/35
See application file for complete search history.

(56) References Cited

U.S. PATENT DOCUMENTS

| 10,159,359 | B2 * | 12/2018 | Borg | .......................... A47F 1/12 |
| 10,568,438 | B2 * | 2/2020 | Hardy | ...................... A47F 1/126 |
| 2010/0206829 | A1 * | 8/2010 | Clements | .................. A47F 1/12 |
| | | | | 211/162 |
| 2017/0305670 | A1 | 10/2017 | Tong | |

FOREIGN PATENT DOCUMENTS

| DE | 10 2016 009 162 | 2/2018 |
| EP | 2 431 304 | 3/2012 |
| JP | 2012-116635 | 6/2012 |

OTHER PUBLICATIONS

European Search Report dated Oct. 16, 2018.

* cited by examiner

*Primary Examiner* — Gene O Crawford
*Assistant Examiner* — Lester Ill Rushin
(74) *Attorney, Agent, or Firm* — Gerald E. Hespos; Michael J. Porco; Matthew T. Hespos

(57) ABSTRACT

A locking device for locking a wheel track (30) of a carton flow bed rack to an end beam (10; 20) of the carton flow bed rack in a mounting position includes a locking plate (50) for connecting the wheel track (30) to the end beam (10; 20) and a cover rail (40) for fixing the locking plate (50) to the wheel track (30). The locking plate (50) has a mounting end (51) configured to engage the end beam (10; 20) in the mounting position. The locking plate (50) further has an elongated protrusion (52) configured to protrude out of the end beam (10; 20) in the mounting position. The cover rail (40) is configured to encase at least partially both the protrusion (52) of the locking plate (50) and an end section of the wheel track (30) in the mounting position.

18 Claims, 4 Drawing Sheets

LOCKING DEVICE AND METHOD FOR LOCKING A WHEEL TRACK TO AN END BEAM, CARTON FLOW BED RACK AND USE

BACKGROUND

Field of the Invention

The invention relates to a locking device and a method for locking a wheel track of a carton flow bed rack to an end beam of the carton flow bed rack, a carton flow bed rack, and a use of a locking device.

Related Art

Carton flow bed racks are used to store and/or distribute loads, in particular parcels, cartons, and/or other goods. Carton flow bed racks are characterized in that they comprise a load side from which the rack is loaded and an unload side from which the rack is unloaded. There are carton flow bed racks that are loaded and unloaded at the same side, and others that are loaded and unloaded at different, e.g. opposite, sides. Carton flow bed racks may comprise wheel tracks to transport loads between a first end beam at a first side of the rack and a second end beam at a second, opposite side of the rack.

For enabling a stable support of these wheel tracks and the loads, the wheel tracks are mounted to the horizontally aligned end beams of the rack. In particular, the provision of carton flow bed racks comprising wide levels may result in a deformation of the wheel tracks and/or the end beams they are connected to. A deformation may also result from the weight of the loads being transported along the wheel tracks.

To prevent a deformation of the wheel tracks and/or the end beams, the connection of the wheel tracks with the end beams should provide sufficient strength and durability.

Furthermore, since the rack may comprise a plurality of wheel tracks at each level, it is advantageous if these connections may be established simply and quickly.

The problem relates to preventing the deformation of wheel tracks and/or end beams of carton flow bed racks, in particular providing an improved connection of the wheel tracks with the end beams of a rack, more particularly of a carton flow bed rack that requires sufficient stability.

SUMMARY

One aspect relates to a locking device for locking a wheel track of a carton flow bed rack to an end beam of the carton flow bed rack in a mounting position, a locking device comprising a locking plate for connecting the wheel track to the end beam and a cover rail for fixing the locking plate to the wheel track. The locking plate comprises a mounting end configured to engage the end beam in the mounting position. The locking plate further comprises an elongated protrusion configured to protrude out of the end beam in the mounting position. The cover rail is configured to encase at least partially both the protrusion of the locking plate and an end section of the wheel track in the mounting position.

The locking device is used to establish a connection between the wheel track of the carton flow bed rack and the end beam of the carton flow bed rack. In particular, the locking device enables establishing a firm and/or stable connection of the wheel track and the end beam in a substantially perpendicular manner. Herein, both the wheel track and the end beam may be provided as substantially horizontally aligned elements (i.e. beams) of the carton flow bed rack.

The end beam may be provided as a load beam and/or unload beam of the carton flow bed rack. The end beam may be arranged at a load side and/or an unload side of the carton flow bed rack for loading and/or unloading the loads. The wheel track may comprise a plurality of wheels upon which the loads may be transported. The wheels may be aligned so that their axes of rotation are parallel to each other and within a substantially horizontally aligned plane. Said plane may comprise a slope for conveying objects by force of gravity.

The locking device is configured and suitable for connecting the wheel track to the end beam, because the locking device may provide a substantial durability, strength, and/or stability. Furthermore, the locking device may enable a simple and quick installation.

The locking device may comprise a plurality of elements. In particular, the locking device may comprise exactly two elements, namely the locking plate and the cover rail. Herein, the locking plate is provided as a flat element, e.g. cut out of a flat, metallic plate. Thus, the locking plate may comprise two flat and/or large surfaces arranged at opposite sides of the locking plate. Each of said flat surfaces may be substantially planar or unbent. The surface area of each of the flat surfaces of the locking plate is larger than the surface area at all the edges of the locking plate put together, in particular at least 5 times larger, preferably at least 10 times larger. The surface area of said edges depends on the thickness of the locking plate. The locking plate may comprise a thickness of about 0.2 mm to about 10 mm, preferably from 2 mm to about 6 mm. The thickness of the locking plate corresponds to the distance between the two flat and/or large surfaces of the locking plate. The locking plate may comprise an overall constant thickness, e.g. both the protrusion and the mounting end may be provided from a flat plate with a substantially constant thickness.

The locking plate is configured and provided to physically contact both the wheel track and the end beam of the carton flow bed rack. Thus, the locking plate is configured and provided to connect these two elements of the carton flow bed rack to each other in a predetermined and/or controlled position. The connection of the locking plate with the end beam may be provided as a form fit. The locking plate may be in physical contact with the wheel track without providing any further attachment of said two elements, at least without the cover rail being present. However, the locking plate may be aligned with respect to the wheel track and fixed in said aligned position to the wheel track by use of the cover rail.

The cover rail is configured and provided to fix and/or attach the locking plate to the wheel track. Thus, the cover rail may be configured and provided to physically contact both the locking plate and the wheel track so that the cover rail may hold the locking plate in its aligned position relative to the wheel track in a form fit.

The cover rail may be provided as an at least partially hollow profile and/or it may comprise a cavity to receive at least partially both the locking plate and the wheel track. The cover rail and/or the locking plate may be provided from metal to provide sufficient support and stability.

The locking plate comprises at least two sections, namely the mounting end and the elongated protrusion. The mounting end is configured to be mounted to the end beam, e.g. to engage the end beam. For example, the mounting end may engage a cavity and/or hollow inside of the end beam in the mounting position. Since the end beam may be provided as a hollow profile, the outer circumference of the mounting end may at least partially correspond to the inside of the end beam to enable a form fit between said two elements of the carton flow bed rack. The outer contour of the mounting end may be shaped to art least partially fit the inner counter of the end beam.

The mounting end may also be mounted to an end beam comprising a closed section. More particularly, the mounting end of the locking plate may at least partially surround (the closed section of) the end beam, while the elongated protrusion protrudes from the mounting end and, thus, the closed section of the end beam. The mounting end may, e.g., be provided as a hook and/or clamp that is mounted onto the end beam. The inner contour of the mounting end may be shaped to at least partially fit the outer counter of the end beam.

The mounting position corresponds to the position wherein the wheel track is locked and mounted to the end beam by the locking device. In the mounting position, the protrusion protrudes out of the end beam. Thus, the protrusion of the locking plate may correspond to all of the locking plate except the mounting end. In other words, the locking plate may consist of only the mounting end and the elongated protrusion. The protrusion of the locking device provides a stable element that is fixed relative to the end beam, and to which the wheel track may be locked.

The wheel track may not only be mounted to the end beam by the locking device alone. Indeed, the wheel track may comprise an engaging end for engaging the end beam at least partially in the mounting position. The engaging end of the wheel track may be hooked into the end beam. While this may provide sufficient support for carrying the loads and/or the weight of the wheel tracks, the wheel track may not be secured and fixed to the end beam by this construction alone. Furthermore, this construction alone may result in a deformation of the wheel tracks and/or end beams. The locking device helps and/or supports fixing the wheel track to the end beam in a secured position. Furthermore, it helps protecting the wheel track and/or end beam from deformation.

The cover rail is encasing both the protrusion of the locking plate and the end section of the wheel track at least partially in the mounting position. In particular, the cover rail may encase the whole protrusion of the locking plate in the mounting position. The cover rail comprises a cavity sufficiently large to receive at least partially the protrusion of the locking plate (e.g. in a form fit) and, additionally at least an end section of the wheel track (e.g. in a form fit).

The cover rail may encompass the wheel track at least partially from at least three or even all four sides. For example, the cover rail may encompass the wheel track from two substantially vertically aligned sides, a substantially horizontally aligned bottom side and, at least partially, from a substantially horizontally arranged upper side. However, the cover rail may comprise an opening in said substantially horizontally aligned upper side to let the wheels of the wheel track at least partially protrude out of said upper side for supporting the loads along the wheel tracks. The locking device enables a strong, stable and easy mounting of the wheel track to the end beam of the carton flow bed rack.

According to an embodiment, the protrusion of the locking device is aligned alongside and/or substantially parallel to the end section of the wheel track in the mounting position. The protrusion comprises an elongated shape. In other words, the section of the locking plate forming and/or providing the protrusion comprises one predetermined direction of extension (parallel to its two flat surfaces) that may be longer than its extension perpendicular to the predetermined direction of extension. The protrusion may be elongated and may protrude out of the end beam along its predetermined direction of extension. This preferred direction of extension is aligned parallel and/or alongside the end section of the wheel track, i.e. parallel to the surveying direction along the wheel tracks. The protrusion may be arranged side by side with the end section of the wheel track. Thus, the cover rail may encase (at least partially) both the end section of the wheel track together with the elongated protrusion of the locking device.

According to an embodiment, two flat surfaces of the locking plate are aligned substantially vertically in the mounting position. Those two flat surfaces correspond to the two flat and/or large surfaces of the locking plate referred to above. The surface of the locking plate may consist of those two flat surfaces plus its edges along the thickness of the locking plate. Thus, the thickness corresponds to its smallest direction of extension. Arranging the locking plate substantially vertically provides a strong resistance against deformation by gravity.

According to an embodiment, the mounting end of the locking plate is arranged with a clearance inside the end beam in the mounting position. In other words, the locking plate is not arranged in a press fit within the end beam but with a clearance instead. The clearance enables moving and/or amending the exact position of the mounting end of the locking plate within the end beam. The clearance also may enable mounting the locking plate within the end beam (e.g. in a form fit) and removing the locking plate from the end beam (if required).

According to an embodiment, the locking device is configured to mount the wheel track to the end beam in a form fit. There may be no need to firmly bond the locking plate to the end beam and/or there may be no need for a force fit. The form fit has the advantage of being easily established and removed. Thus, the carton flow bed rack is easily mounted and/or assembled.

According to an embodiment, in the mounting position, the protrusion of the locking plate is at least partially arranged within a bent upper edge of the end section of the wheel track, and the cover rail encases at least partially the protrusion of the locking plate within the bent upper edge of the end section of the wheel track. The bent upper edge may be provided by a side rail of the wheel track, e.g. a side rail for holding the wheel axles of the wheels. The bent upper edge may provide an upper end stop for an upper rim of the protrusion of the locking plate. Said upper rim of the protrusion of the locking plate may be arranged within the bent upper edge of the wheel track. Therefore, the thickness of the locking plate may be smaller than the width of a receptacle provided by said bent upper edge of the end section of the wheel track. Arranging the elongated protrusion within the receptacle provided by the bent upper edge of the wheel track enables an alignment of the protrusion along and/or parallel to the end section of the wheel track, e.g. an alignment of the upper rim of the protrusion to the (bent) upper edge of the wheel track. Furthermore, the cover rail will automatically encase the protrusion together with the end section of the wheel track when encasing the end section of wheel track including its bent upper edge. Thus, this design enables a quick assembly of the carton flow bed rack.

According to an embodiment, the protrusion of the locking plate comprises pointed teeth along an upper rim. The pointed teeth may be arranged along the upper rim (and/or edge) of the locking plate protruding out of the end beam. The teeth may by provided with the same thickness as the locking plate itself, e.g. as an extension of the flat surfaces of the locking plate along its upper rim. The pointed teeth enable a safe positioning of the upper rim of the protrusion with respect to wheel axles of the wheels of the wheel track. The teeth are provided with a point each for supporting the alignment of the wheel axles between the teeth of the protrusion. In the mounting position, the wheel axles of the wheels of the wheel track may engage between a predetermined number of teeth of the protrusion. For example, the distance between the wheel axles may correspond to the width of a predetermined number of teeth, e.g. about two to about ten teeth, preferably between about two and about five teeth of the protrusion. Thus, the teeth of the protrusion support a safe and secure alignment of the locking plate with respect to the wheel track.

According to an embodiment, the locking plate is substantially L-shaped, the protrusion of the locking plate forming the longer L-leg and the mounting end of the locking plate forming the smaller L-leg. The L-shape provides sufficient stability and support for locking the wheel track to the end beam.

An aspect relates to a carton flow bed rack comprising at least one wheel track and at least one end beam. The wheel track is locked to the end beam by a locking device according to the previous aspect. In particular, the wheel track may be locked at both its ends to a respective end beam of the rack by a locking device according to the preceding aspect. The two locking devices may comprise the same shape. In other words, the same type of locking device comprising the cover rail and the locking plate may be used to fix both ends of the respective wheel track to its respective end beam. The carton flow bed rack may comprise a plurality of wheel tracks at each of a plurality of levels, wherein a plurality or even all of the wheel tracks is locked at least at one side to an end beam of the rack by a locking device according to the previous aspect.

An aspect relates to a method of locking a wheel track of a carton flow bed rack to an end beam of the carton flow bed rack, comprising the steps:
  providing a locking plate for connecting the wheel track to the end beam;
  providing a cover rail for fixing the locking plate to the wheel track;
  arranging a mounting end of the locking plate so that it engages the end beam and that an elongated protrusion of the locking plate protrudes out of the end beam; and
  encasing at least partially both the protrusion of a locking plate and an end section of the wheel track with the cover rail.

The method may be executed by use of a locking device according to the aspect referred to above. Therefore, the description of the locking device and/or the carton flow bed rack is also relevant for the method and vice versa. The wheel track is locked and mounted safely to the end beam of the carton flow bed rack by encasing both the protrusion and the end section of the wheel track by the cover rail.

According to an embodiment, the protrusion of the locking plate is aligned substantially parallel to and/or alongside the end section of the wheel track. This may be accomplished in a method step during which said alignment is actively established.

According to an embodiment,
  arranging the mounting end of the locking plate within the end beam so that the elongated protrusion of the locking plate protrudes out of the end beam,
  aligning two flat surfaces of the locking plate substantially vertically,
  aligning the protrusion of the locking plate askew to the end section of the wheel track; and then
aligning the protrusion of the locking plate substantially parallel to and alongside the end section of the wheel track and the cover rail is then slid over the aligned protrusion of the locking plate.

The wheel track may be locked to the end beam in a plurality of method steps. In one step, a mounting end of the locking plate is arranged within the end beam. The protrusion then protrudes out of the locking plate. However, the protrusion is not yet arranged in its final mounting position, but in a semi-assembled position that enables a safe engagement of the mounting end within the end beam of the rack. In this semi-assembled position of the locking plate, the protrusion is arranged askew to the end section of the wheel track. In other words, the protrusion is not yet aligned substantially parallel and/or alongside the end section of the wheel track as in its mounting position.

In a following step, the fully aligned position of the protrusion relative to the end section of the wheel track is established, e.g. by a rotational movement of the locking plate out of its semi-assembled position. In both its askew (i.e. semi-assembled) position and its parallel (to the wheel track) aligned position, the mounting end of the locking plate is arranged and remains within the end beam. Thus, the mounting end is designed and configured to allow said movement and alignment of the protrusion from its semi-assembled position into its aligned (i.e. mounting) position.

When the protrusion is aligned with respect to the end section of the wheel track (i.e. in its mounting position), the cover rail may easily be slid over both the protrusion and the end section of the wheel track.

Before the cover rail is slid over the protrusion, the cover rail may be arranged so that it encases a section of the wheel track different from the end section. For example, the cover rail may be arranged at a middle section of the wheel track while the locking plate is arranged in its semi-assembled and askew position. The cover rail may also by arranged at a middle section of the wheel track after the locking plate is arranged in its semi-assembled position and askew position. After aligning the protrusion parallel with respect to the end section of the wheel track, the cover rail is slid in the mounting position wherein it encases both the wheel track and the protrusion.

According to an embodiment, some wheel axles of the wheels of the wheel track are arranged between pointed teeth along an upper rim of the protrusion of the locking plate. This enables a safe and predetermined positioning of the locking device provided by the locking plate and the cover rail with respect to the wheel track.

An aspect relates to the use of a locking device according to the above described aspect to lock a wheel track of a carton flow bed rack to an end beam of the carton flow bed rack.

The terms upper, lower, below, above, etc., as used herein, refer to the reference system of the Earth in a mounting position of the rack and/or the locking device.

The numbers and/or angles given in the claims and the description are not limited to the exact numbers and/or angles, but may include measurement inaccuracies within limits that still enable solving the underlying problem.

Embodiments of the invention are described with reference to the figures. Features of the embodiments shown in the figures may be combined with each other and/or further embodiments. Identical reference numbers identify identical or similar features of the embodiments.

DETAILED DESCRIPTION

Figure 1:
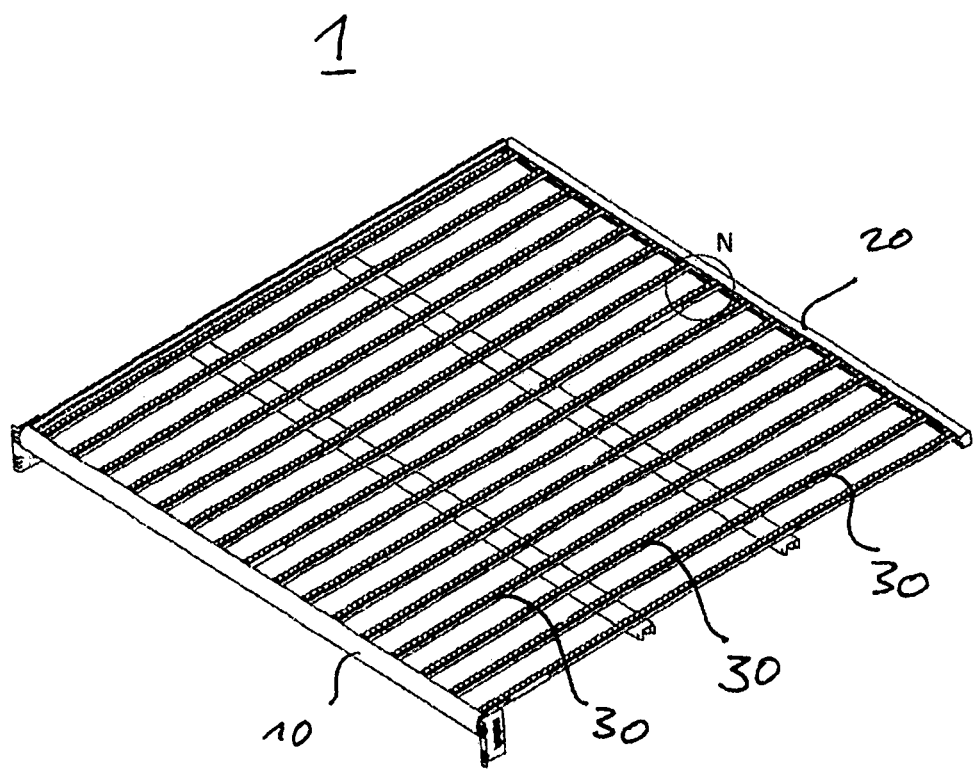
FIG. 1 is a perspective view of a level of a carton flow bed rack, wherein wheel tracks are mounted to and between end beams.

FIG. 1 shows a perspective view of a carton flow bed rack level 1. A carton flow bed rack may comprise a plurality of such levels 1. The level 1 comprises a plurality of wheel tracks 30 aligned substantially parallel to each other along the level 1 of the carton flow bed rack. Each wheel track 30 is mounted at a first end to a load beam 20 and at a second, opposite end to an unload beam 10. The unload beam 10 and the load beam 20 are provided as end beams of the carton flow bed rack.

Another carton flow bed rack level may comprise an end beam at a first side that is both a load beam and an unload beam and, at the opposite side, a stop beam as an end beam where loads are neither unloaded nor loaded to the level.

Each wheel track comprises a plurality of wheels. Upper ends of wheel mantels of the wheels form a conveying surface for the loads along the carton flow bed rack level 1. The loads may be conveyed along the extension direction of the wheel tracks 30. Each load may then be supported by at least two of the wheel tracks 30.

The wheel tracks 30 may be arranged at an inclination of, e.g., up to about 20° towards a horizontal plane. Preferably, the wheel tracks are arranged at a smaller inclination. For example, the wheel tracks may be arranged at an inclination of about 1° to about 5° with respect to a horizontally aligned plane.

Except for the inclination referred to above, the whole carton flow bed rack level 1 may be arranged substantially horizontally. In particular, both end beams 10 and 20 may be arranged substantially horizontal and substantially perpendicular to the wheel tracks 30.

The ends of each wheel track 30 may be engaging the respective end beam 10 or 20 they are facing. Thus, each wheel track 30 is supported at its opposite ends by the respective end beam 10 or 20. However, in particular with wide carton flow bed rack levels 1, there is a risk that said end beams 10 and/or 20 may be deformed and/or bent when loading and/or unloading loads to and/or from the level 1. The deformation may, e.g., include a torsion.

To prevent and/or reduce deformation of elements of the level 1, at each end of each wheel track 30, there is provided a locking device further referred to with respect to the following figures.

Carton flow bed racks may comprise a plurality of wheel tracks 30 arranged substantially parallel to each other. Some carton flow bed racks may further comprise unload trays for supporting the loads at, e.g., an end of the level 1. In these carton flow bed racks, a plurality of loads, in particular parcels and/or cartons, may be loaded at the load side (in FIG. 1 at the load beam 20). The carton flow bed rack level 1 supports loading cartons from the load side at the load beam 20 and unloading them from the opposite side, the unload side, of the carton flow bed rack level 1, i.e. at the unload beam 10. This configuration of the carton flow bed rack is sometimes referred to as FIFO—"First In First Out". In different embodiments, carton flow bed racks may support loading and unloading at the same side. These configurations of carton flow bed racks are sometimes referred to as LIFO—"Last In First Out". The invention may be implemented in a LIFO and/or in a FIFO carton flow bed rack.

Figure 2A:
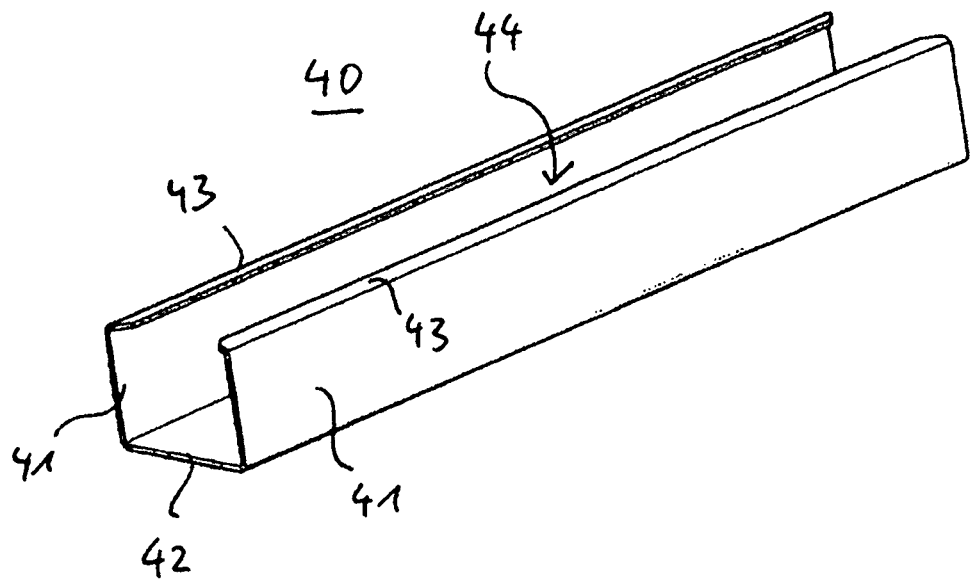
FIG. 2A is a perspective view of a cover rail of a locking device.

FIG. 2A shows in a perspective view a cover rail 40 of a locking device for locking the wheel track 30 to the respective end beam 10 and/or 20. The cover rail 40 is provided as a substantially elongated rail provided as a hollow profile. The cover rail 40 comprises two substantially vertically aligned rail sides 41 connected to each other by a substantially horizontally aligned rail bottom 42. The rail sides 41 together with the rail bottom 42 provide a substantially U-shaped form in cross section.

Along the upper rim of each rail side 41, a top strip 43 is arranged along the hole length of the cover rail 40. At the top strips 43, the upper rim of the rail sides 41 are bent inwards and towards each other, thereby forming a protrusion and/or a hook for mounting the cover rail 40 to one of the wheel tracks 30.

Formed by and within the rail sides 41, the rail bottom 42 and the top strips 43, the cover rail 40 comprises a cavity 44. The cavity 44 is dimensioned so that its inner dimensions substantially correspond to the outer dimensions of the wheel tracks 30. A clearance may be provided between these elements to enable smooth sliding of the cover rail 40 along the wheel tracks 30.

In the shown embodiment, the cross section of the cover rail 40 is constant and unchanged along substantially the whole length of extension of the cover rail 40.

Figure 2B:
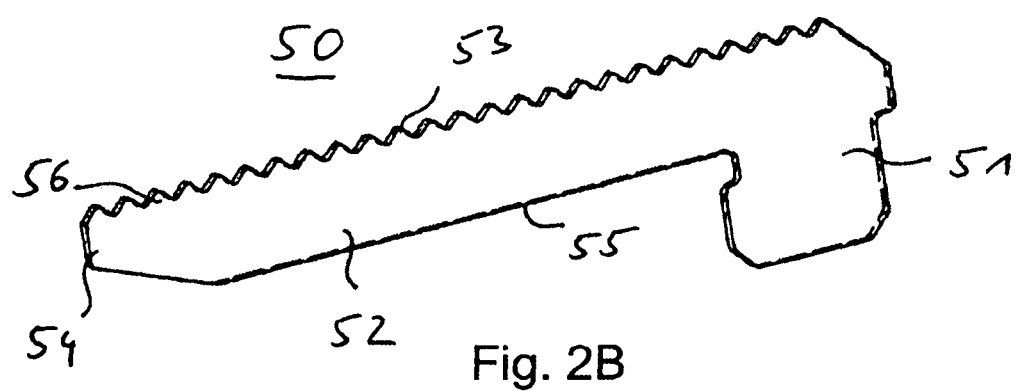
FIG. 2B is a perspective view of a locking plate of a locking device.

FIG. 2B shows a perspective view of a locking plate 50 of the locking device. The locking plate 50 is provided as a flat, e.g. metallic, plate, provided in an L-shape. One L-leg is provided by a mounting end 51 of the locking plate, while the other L-leg is provided by an elongated protrusion 52 of the locking plate 50.

The mounting end 51 is provided with larger extensions in a substantially vertical direction than the protrusion 52. Thus, the locking plate 50 comprises a larger extension in a vertical direction at the mounting end 51 than at the protrusion 52. The mounting end 51 is shaped to fit into a beam cavity provided by the hollow profile of the end beam 10 and/or 20 of the carton flow bed rack level 1 (shown in FIG. 1).

The protrusion 52 is provided as an elongated section of the locking plate 50. The protrusion 52 comprises a lower rim 55 and an upper rim 56. At the end of the protrusion opposite the mounting end 51, the locking plate 50 comprises a protrusion end 54. Most of the protrusion 52 comprises a substantially constant height, i.e. vertical extension. However, at the protrusion end 54, the vertical extension of the protrusion 52 decreases towards said protrusion end 54. In particular, the lower rim 55 is bent upwards at the protrusion end 54, thereby reducing the vertical height of the protrusion 52 towards the protrusion end 54.

Along the upper rim 56 of the protrusion 52, the locking plate 50 comprises pointed teeth 53. The pointed teeth 53 may be provided along the whole upper rim 56 of the locking plate 50. In a different embodiment, the teeth 53 are at least provided along the protrusion 52 of the locking plate 50.

The vertical height of the protrusion 52, namely the distance from the lower rim 55 to the tip of the teeth 53 at the upper rim 56, may be slightly smaller than the vertical height of the rail side 41 of the cover rail 40 shown in FIG. 2A. Thus, the protrusion 52 fits in a vertically aligned state into the cavity 44 of the cover rail 40, in particular between the rail bottom 42 and the top strip 43 at the upper rim of the rail side 41. In an embodiment, the vertical height of the protrusion 52 may be about 1% to about 10% less than the vertical height of the rail side 41, preferably between about 2% and about 5% smaller.

All teeth 53 comprise the exact same dimensions, namely the same height, the same width, and the same thickness (corresponding to the substantially constant overall thickness of the locking plate 50). Between two adjacent teeth 53, a downwardly pointing receptacle is provided for receiving a wheel axle of the wheels 31 of the wheel track 30 (see also FIG. 4).

The cover rail 40 and the locking plate 50 are components of the locking device used to lock the wheel tracks 30 to the end beams 10 and/or 20.

Figure 3A:
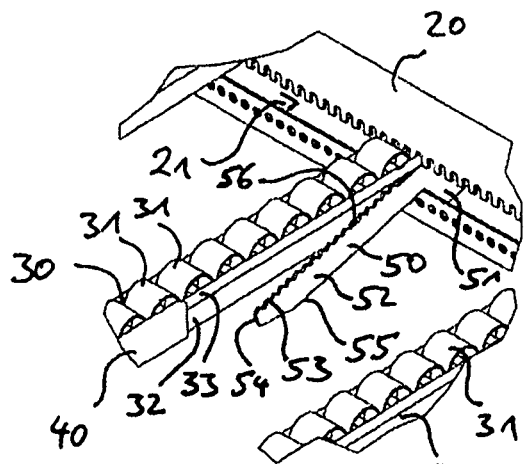
FIG. 3A is a perspective view of an end section of a wheel track at an end beam, wherein a mounting end of a locking plate is engaging the end beam and a protrusion of the locking plate is askew with the wheel track.
Figure 3B:
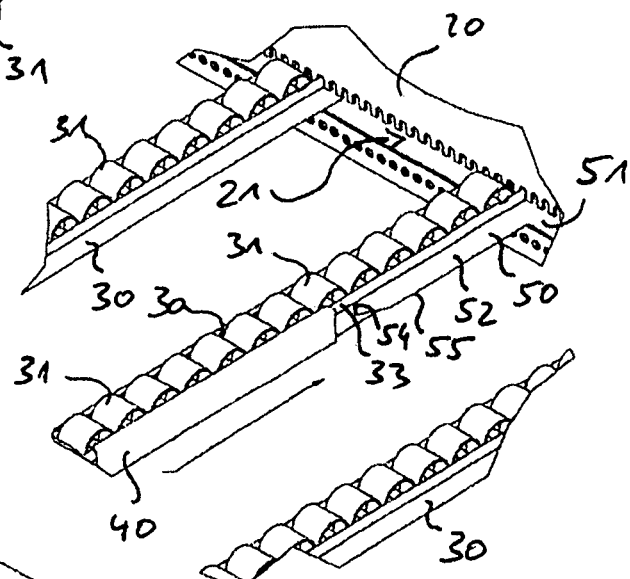
FIG. 3B is a perspective view of the end section of the wheel track at the end beam, wherein the protrusion of the locking plate is aligned with the wheel track and a cover rail is moved towards the end beam.
Figure 3C:
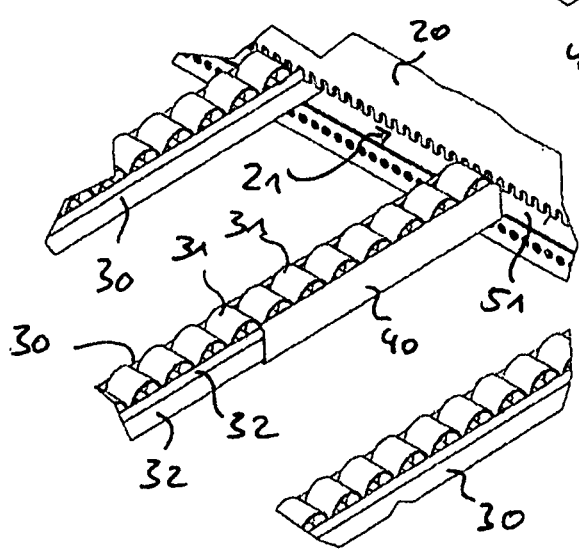
FIG. 3C is a perspective view of the end section of the wheel track at the end beam, wherein the cover rail is arranged so that it encases the protrusion and the end section of the wheel track, thereby locking the wheel track to the end beam.

FIGS. 3A to 3C show a perspective view of an end section of one of the wheel tracks 30 at the load beam 20 at different stages of mounting the locking device to the carton flow bed rack. The section of the carton flow bed rack level 1 shown in the FIGS. 3A to 3C is marked in FIG. 1 as section N.

FIG. 3A shows how the locking plate 50 is partially engaged into a beam cavity 21 provided by the load beam 20, adjacent to one of the wheel tracks 30. In the shown situation, the mounting end 51 of the locking plate 50 is engaged into the beam cavity 21. Right next to and adjacent to the locking plate 50, an end of the wheel track 30 is also protruding from the beam cavity 21. The load beam 20 is provided as a hollow profile comprising an opening of its beam cavity 21 towards the wheel track 30. Multiple wheel tracks 30 carrying loads may cause strain to the end section of said wheel track 30 and/or to the end beam 20. The locking device consisting of the cover rail 40 and the locking plate 50 may stabilise the construction, thereby reducing and/or preventing a deformation and/or twisting of said components.

FIG. 3A shows first steps of a method to lock the wheel track 30 to the load beam 20. As described above, the mounting end 51 of the locking plate 50 is arranged within the beam cavity 21. A protrusion 52 protrudes out of the beam cavity 21 of the load beam 20. The locking plate 50 is arranged so that the teeth 53 of the protrusion 52 are arranged along the upper rim 56 of the protrusion 52. Furthermore, the locking plate 50 is arranged in a substantially vertical plane. This corresponds to the two flat and/or large surfaces of the locking plate 50 arranged at opposite ends of the locking plate 50 both being arranged substantially vertically.

The protrusion 52 extends out of the beam cavity 21 so that the protrusion end 54 of the protrusion 52 is arranged below the mounting end 51 of the locking plate 50. In other words, the protrusion 52 is aligned askew to the wheel track 30. In this askew arrangement, the mounting end 51 may be inserted more easily into the beam cavity 21 then when the protrusion 52 is arranged substantially parallel to the wheel track 30.

The upper rim 56 of the protrusion 52 is arranged so that it engages a bent upper edge 33 of a side rail 32 of the wheel track 30. The wheel track 30 comprises two side rails 32 that are substantially vertically aligned and that hold opposite ends of axles of wheels 31 of the wheel track 30. Along their upper edges, the side rails 32 are bent outwards, namely away from the wheels 31. Thus, the bent upper edges 33 of the side rails 32 are formed. Within a receptacle formed between the side rail 32 and the bent upper edge 33, ends of the axles of the wheels 31 may be arranged. Furthermore, the upper rim 56 and/or the teeth 53 of the locking plate 50 may be arranged in said receptacle, namely below the bent upper edge 33 of one of the side rails 32 arranged adjacent the locking plate 50.

In the situation shown in FIG. 3A, only a section of the locking plate 50 that is part of the mounting end 51 may be arranged within said receptacle provided by the bent upper edge 33 of the side rail 32. Some or all of the teeth 53 are arranged below the bent upper edge 33 and, more particularly, out of said receptacle. In this situation, the protrusion 52 is arranged askew to the wheel track 30. Thus, an angle is formed between the predetermined direction of extension of the protrusion 52 and the direction of extension of the wheel track 30 and/or its side rails 32 (corresponding to its conveying direction).

Only partially shown in FIG. 3A, the cover rail 40 is arranged on the wheel track 30 but still spaced apart from the load beam 20 and the locking plate 50.

FIG. 3B shows another alignment of the same components, e.g. a second step of a method of locking the wheel track 30 to the load beam 20. FIG. 3B shows that the protrusion 52 is moved and/or rotated upwards below the bent upper edge 33 of the side rail 32. As shown in FIG. 3B, all teeth 53 of the locking plate 50 are arranged below the bent upper edge 33 of the side rail 32. In the receptacle formed between the bent upper edge 33 and the side rail 32, the teeth 53 are arranged between the ends of the axles of the wheels 31.

The bent upper edge 33 prevents a displacement of the protrusion 52 and aligns the protrusion 52 parallel to and alongside the wheel track 30. In this arrangement, the locking plate 50 is arranged in its mounting position. However, it is not yet secured there by the cover rail 40. As indicated in FIG. 3B by an arrow, the cover rail 40 is then moved in the direction of the arrow towards the load beam 20 and onto the protrusion 52.

FIG. 3C shows a next and/or final arrangement, wherein the cover rail 40 is moved along the wheel track 30 so that it physically contacts and/or abuts the load beam 20. In this arrangement, the cover rail 40 covers the protrusion 52 of the locking plate 50 substantially completely. Furthermore, the cover rail 40 covers an end section of the wheel track 30 that is at least as long as the protrusion 52. Said end section of the wheel track 30 is arranged adjacent the end beam 20 and/or protruding from it.

In different embodiments, the cover rail 40 may be shorter, so that it only partially covers the protrusion 52. Preferably, however, the cover rail 40 is at least as long as the predetermined direction of extension of the protrusion 52 and encases it completely in the mounting position.

In the situation shown in FIG. 3C, the locking plate 50 is safely and securely locked both within the beam cavity 21 of the load beam 20 and within the receptacle below the bent upper edge 33 of the wheel track 30. It is held by the cover rail 40 within said position so that it may not be moved out of the receptacle below the bent upper edge 33 of the wheel track 30. In this situation, the wheel track 30 is safely locked to the end beam, here the load beam 20.

Not shown in the Figures, the wheel tracks 30 may further be provided with a middle rail arranged at a middle section of the wheel track 30. The middle rail may comprise substantially the same shape as the cover rail 40, in particular the same cross section. However, the middle rail may be provided comprising a larger length. In particular, the middle rail may extend from the cover rail 40 at the unload beam 20 towards another cover rail 40 provided at the load beam 10 that is part of another locking device for locking the opposite end of the wheel track 30 to the unload beam 10. In other words, the middle rail may extend between two cover rails 40 arranged at the opposite ends of the wheel track 30. Thus, the middle rail may prevent the cover rail(s) 40 from moving out of its (their) mounting position (shown in FIG. 3C). In an embodiment, the middle rail may be provided not as a single rail, but as a plurality of middle rails.

Figure 4A:
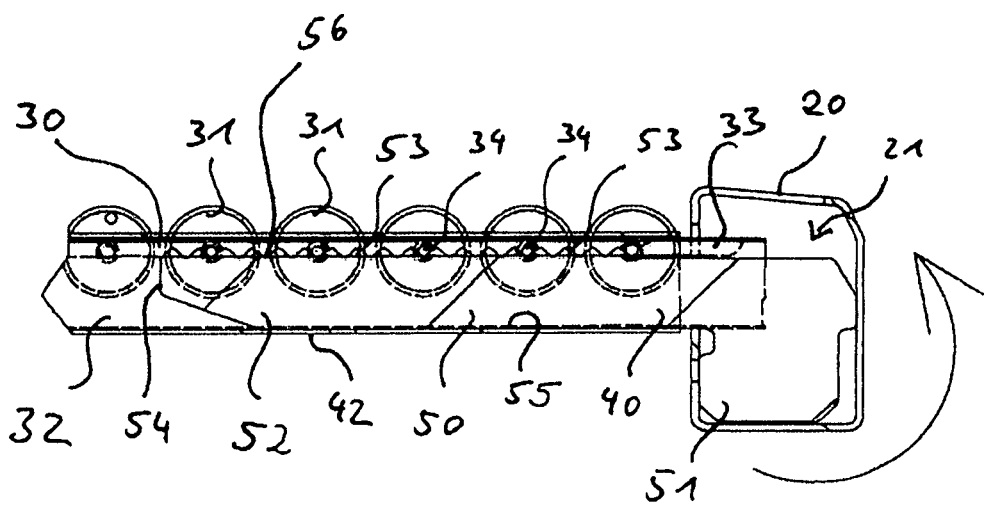
FIG. 4A is a side view of the end section of the wheel track locked to a load beam by a locking device with transparent components.

FIG. 4A shows a side view of the end section of the wheel track 30 locked to the load beam 20 by the locking device. Here, some components are shown transparent to enable a better view on the arrangement.

The protrusion 52 of the locking plate 50 is arranged within the cover rail 40. The cover rail 40 and the protrusion 52 are aligned parallel to the wheel track 30. The teeth 53 along the upper rim 56 of the locking device 50 are arranged in the receptacle below the bent upper edge 33 of the side rail 32. In said receptacle, a plurality of wheel axles 34 of the wheels 31 is arranged in a tooth gap, respectively.

In the shown embodiment, exactly four teeth are arranged between two adjacent wheel axles 34. In the shown engaged and mounted position, the locking plate 50 may not be displaced relative to the wheel track 30.

A displacement of the locking plate 50 in an upper direction is impeded both by the wheel axles 34 and the upper edge 33. Said displacement is also impeded at the mounting end 51 by the load beam 20 (as an end beam).

A displacement of the locking plate 50 in a downward direction is impeded by the cover rail 40, in particular the rail bottom 42 of the cover rail 40. Said displacement is also impeded at the mounting end 51 by the end beam 20.

A substantially horizontal displacement of the locking plate 50 in the direction towards the load beam 20 is impeded by the mounting end 51 that is arranged adjacent and/or in direct vicinity of an outer side wall of the load beam 20. Said displacement may also be impeded by the wheel axles 34 engaged with the teeth 53.

Displacement in a substantially horizontal direction towards the inside of the carton flow bed level 1, namely away from the load beam 20, is impeded by another section of the mounting end 51 being arranged adjacent and/or in vicinity of an inner wall of the load beam 20. Said horizontal movement parallel to the wheel track 30 may further be impeded by the wheel axles 34 engaged with the teeth 53.

A displacement of the locking plate 50 in a horizontal direction towards the wheel track 30 is impeded by the side rail 32 facing the locking plate 50.

A displacement of the locking plate 50 in a substantially horizontal direction away from the wheel track 30 is impeded by the cover rail 40, in particular its rail side 41 (see FIG. 2A) being arranged adjacent and facing the protrusion 52.

In other words, the locking plate 50 is safely locked within and relative to the end beam 20. It is also locked relative to the end section of the wheel track 30.

The mounting end 51 is arranged in a form fit within the beam cavity 21 of the load beam 20. The form fit is a result of the shape of the mounting end 52 at least partially corresponding to the shape of the beam cavity 21. However, the outer shape of mounting end 51 (in the shown side view) does not completely correspond to the inner shape of the beam cavity 21. Indeed, the mounting end 51 comprises only some sides that are arranged tight to the inner sides of the beam cavity 21, namely a section of the lower edge of the mounting end 51, a section of the inner rim of the mounting end 51 (facing the opposite end beam 10), and a section of the outer rim of the mounting end 51 (facing away from the protrusion 52 and the wheel track 31).

The mounting end 51 comprises (in the shown side view) recessed edges and, thus, sufficient clearance for the mounting end 51 to be rotated within the beam cavity 21 between its askew (semi-assembled) position (shown in FIG. 3A) and its aligned, mounting position (shown in FIG. 3B). Furthermore, the mounting end 51 comprises (in the shown side view) at least one side without contact with the interior of the end beam 20, here its upper rim, which also supports said rotation during assembly.

Figure 4B:
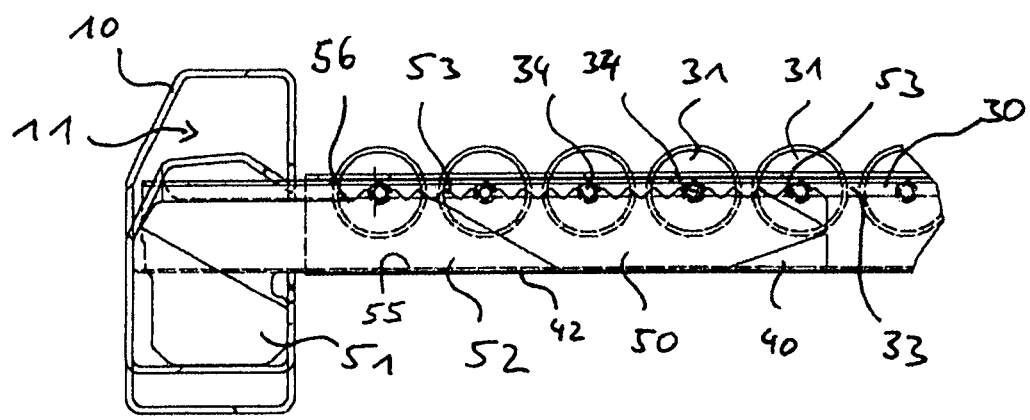
FIG. 4B a side view of the opposite end section of the wheel track locked to an unload beam by a locking device with transparent components.

FIG. 4B shows the same mounted situation as FIG. 4A at the opposite end of the wheel track 30. Here, the wheel track 30 is locked to the unload beam 10. The situation is substantially mirror-inverted. Exactly as at the load beam 20, the protrusion 52 of the locking plate 50 is held within the cover rail 40 and below the bent upper edge 33 of the wheel track 30.

Both FIGS. 4A and 4B show that the very end of the wheel track 30 protrudes into the beam cavity 21 and 11, respectively. To prevent displacement of said end of the wheel track and/or to securely lock said end to the respective end beam 10 and 20, the locking device is used to establish a safe and locked position of the wheel tracks 30 of the carton flow bed rack level 1 as shown in FIG. 1.

The described locking device enables a safe and easily assembled solution for securely fixing the wheel tracks 30 of the carton flow bed rack level 1.

LIST OF REFERENCE NUMERALS 1 carton flow bed rack level
10 unload beam
11 beam cavity
20 load beam
21 beam cavity
30 wheel track
31 wheel
32 side rail
33 bent upper edge
34 wheel axle
40 cover rail
41 rail side
42 rail bottom
43 top strip 44 cavity
50 locking plate
51 mounting end
52 protrusion
53 teeth
54 protrusion end
55 lower rim
56 upper rim

What is claimed is:

1. A locking device for locking a wheel track (30) of a carton flow bed rack to an end beam (10; 20) of the carton flow bed rack in a mounting position, the locking device comprising:
   a locking plate (50) for connecting the wheel track (30) to the end beam (10; 20) and
   a cover rail (40) for fixing the locking plate (50) to the wheel track (30); wherein
   the locking plate (50) comprises a mounting end (51) configured to engage the end beam (10; 20) in the mounting position;
   the locking plate (50) further comprises an elongated protrusion (52) configured to protrude out of the end beam (10; 20) in the mounting position;
   the cover rail (40) is configured to encase at least partially both the protrusion (52) of the locking plate (50) and an end section of the wheel track (30) in the mounting position;
   the locking plate (50) is substantially L-shaped and has a longer L-leg and a smaller L-leg, the protrusion (52) of the locking plate (50) forming the longer L-leg and the mounting end (51) of the locking plate (50) forming the smaller L-leg.

2. The locking device of claim 1, wherein the protrusion (52) of the locking plate (50) is aligned alongside and/or substantially parallel to the end section of the wheel track (30) in the mounting position.

3. The locking device of claim 2, wherein two flat surfaces of the locking plate (50) are aligned substantially vertically in the mounting position.

4. The locking device of claim 3, wherein the mounting end (51) of the locking plate (50) is arranged with a clearance inside the end beam (10; 20) in the mounting position.

5. The locking device according of claim 4, wherein the locking device is configured to mount the wheel track (30) to the end beam (10; 20) in a form fit.

6. The locking device of claim 5, wherein, in the mounting position, the protrusion (52) of the locking plate (50) is at least partially arranged within a bent upper edge (33) of the end section of the wheel track (30), and wherein the cover rail (40) encases at least partially the protrusion (52) of the locking plate (50) within the bent upper edge (33) of the end section of the wheel track (30).

7. The locking device of claim 6, wherein the protrusion (52) of the locking plate (50) comprises pointed teeth (53) along an upper rim (56).

8. The locking device of claim 7, wherein the pointed teeth (53) are configured to receive wheel axles (34) of wheels (31) of the wheel track (30) between them.

9. The locking device of claim 1, wherein two flat surfaces of the locking plate (50) are aligned substantially vertically in the mounting position.

10. The locking device of claim 1, wherein, in the mounting position, the protrusion (52) of the locking plate (50) is at least partially arranged within a bent upper edge (33) of the end section of the wheel track (30), and wherein the cover rail (40) encases at least partially the protrusion (52) of the locking plate (50) within the bent upper edge (33) of the end section of the wheel track (30).

11. The locking device of claim 1, wherein the protrusion (52) of the locking plate (50) comprises pointed teeth (53) along an upper rim (56).

12. The locking device of claim 11, wherein the pointed teeth (53) are configured to receive wheel axles (34) of wheels (31) of the wheel track (30) between them.

13. A carton flow bed rack comprising at least one wheel track (30) and at least one end beam (10; 20), wherein the wheel track (30) is locked to the end beam (10; 20) by the locking device of claim 1.

14. A method of locking a wheel track (30) of a carton flow bed rack to an end beam (10; 20) of the carton flow bed rack, comprising the steps:
   providing a substantially L-shaped locking plate (50) for connecting the wheel track (30) to the end beam (10; 20), the substantially L-shaped locking plate having a longer L-leg and a smaller L-leg;
   providing a cover rail (40) for fixing the locking plate (50) to the wheel track (30);
   arranging a mounting end (51) of the locking plate (50) forming the smaller L-leg so that the mounting end (51) engages the end beam (10; 20) and so that an elongated protrusion (52) of the locking plate (50) forming the longer L-leg protrudes out of the end beam (10; 20); and
   encasing at least partially both the protrusion (52) of the locking plate (50) and an end section of the wheel track (30) with the cover rail (40).

15. The method of claim 14, further comprising aligning the protrusion (52) of the locking plate (50) substantially parallel to and/or alongside the end section of the wheel track (30).

16. The method of claim 14, further comprising
   arranging the mounting end (51) of the locking plate (50) within the end beam (10; 20) so that the elongated protrusion (52) of the locking plate (50) protrudes out of the end beam (10; 20),
   aligning two flat surfaces of the locking plate (50) substantially vertically,
   aligning the protrusion (52) of the locking plate (50) askew to the end section of the wheel track (30) and then
   realigning the protrusion (52) of the locking plate (50) to be aligned substantially parallel to and alongside the end section of the wheel track (30) and then sliding the cover rail (40) over the aligned protrusion (52) of the locking plate (50).

17. The method of claim 14, wherein at least some wheel axles (34) of the wheels (31) of the wheel track (30) are arranged between pointed teeth (53) along an upper rim (56) of the protrusion (52) of the locking plate (50).

18. A locking device for locking a wheel track (30) of a carton flow bed rack to an end beam (10; 20) of the carton flow bed rack in a mounting position, the locking device comprising:
   a locking plate (50) for connecting the wheel track (30) to the end beam (10; 20) and
   a cover rail (40) for fixing the locking plate (50) to the wheel track (30); wherein
   the locking plate (50) comprises a mounting end (51) configured to engage the end beam (10; 20) in the mounting position;
   the locking plate (50) further comprises an elongated protrusion (52) configured to protrude out of the end beam (10; 20) in the mounting position;

the cover rail (40) is configured to encase at least partially both the protrusion (52) of the locking plate (50) and an end section of the wheel track (30) in the mounting position; and in the mounting position, the protrusion (52) of the locking plate (50) is at least partially arranged within a bent upper edge (33) of the end section of the wheel track (30), and wherein the cover rail (40) encases at least partially the protrusion (52) of the locking plate (50) within the bent upper edge (33) of the end section of the wheel track (30).

* * * * *